United States Patent Office 3,068,210
Patented Dec. 11, 1962

3,068,210
VINYL CHLORIDE POLYMERS
Stuart D. Douglas, deceased, late of Charleston, W. Va., by the National Bank of Commerce of Charleston, executor, Charleston, W. Va., assignor to Union Carbide Corporation
No Drawing. Filed Sept. 27, 1956, Ser. No. 612,351
1 Claim. (Cl. 260—78.5)

This invention relates to the production of fusible and reactive internally-plasticized vinyl chloride polymers, and to the infusible and insoluble flexible polymers derived therefrom. More particularly it is concerned with terpolymers of vinyl chloride with a multi-ethylenically unsaturated oxygen containing monomer and a plasticizing mono-ethylenically unsaturated ester.

The addition of plasticizing agents to vinyl chloride-containing resins to improve the resin's workability has long been known. For best results the plasticizer was selected with regard for the intended use of the plastic composition. It is also known that the plasticizer in such mechanical mixtures tends to migrate. Eventually, either by evaporation, or by solution, or by absorption into substances which come into contact with the plasticized resin composition the plasticizer is lost, leaving the resin in a stiff and brittle condition. This problem has been ameliorated to some extent by proper selection of plasticizers; but so long as the resin composition is at best a chemical mixture, the problem still remains.

The present invention is based on the discovery that vinyl chloride polymers can be produced which are inherently flexible and which need not be blended with plasticizing agents. These polymers are resins wherein a plasticizing mono-ethylenically unsaturated ester is chemically combined into the molecule. This ester has a plasticizing effect on the polymer and since it is chemically bound into the molecule the resins produced do not suffer from the defects arising from loss of plasticizer as in the case of prior vinyl chloride resins.

In accordance with this invention on copolymerizing vinyl chloride with a multi-ethylenically unsaturated oxygen containing monomer and a plasticizing mono-ethylenically unsaturated ester, there is produced a fusible and reactive, internally-plasticized vinyl chloride polymer. This fusible and reactive polymer can then be thermoset at an elevated temperature in the presence of a catalyst to produce flexible tough, infusible and insoluble compositions. As far as is known the improved properties of the polymer are due at least in part to cross-linked terpolymers. By selection of plasticizing monomer in accord with the present improvement it is possible to produce cured compositions ranging from semi-rigid to flexible infusible and insoluble polymers.

The multi-ethylenically unsaturated oxygen containing monomers of this invention are those compounds having at least one —C—O—C— linkage in the molecule. Also included among the compounds useful in this invention are those compounds which have an oxygen atom attached to one of the carbon atoms adjacent to the oxygen atom in the —C—O—C— linkage and which are known as esters. These multi-ethylenically unsaturated oxygen containing monomers are also characterized by the presence therein of at least two ethylenic groups and no other reactive polymerizable groups.

The multi-ethylenically unsaturated oxygen containing monomers can be mono-ethers, di-ethers, tri-ethers, mono-esters or di-esters, which contain at least two ethylenic groups in the molecule. Illustrative of the compounds which can be used in this invention are allyl crotonate, crotyl crotonate, vinyl crotonate, diallyl oxalate, diallyl succinate, diallyl adipate, diallyl 3,4-epoxytetrahydrophthalate, diallyl tetrachlorophthalate, diallyl pimelate, diallyl azelate, diallyl sebacate, diallyl phthalate, dicyclopentenyl phthalate, diallyl tetrahydrophthalate, dimethallyl succinate, alpha alkenyl divinyl adipate, divinyl pimelate, 1-allyloxy-2-vinyloxyethane, 1,2-divinyloxyethane, 1,2-diallyloxyethane, divinyl ether, diallyl ether, vinyl allyl ether, dicyclopentenyl ether, triallyl cyanurate and other multi-ethylenically unsaturated symmetrical or unsymmetrical compounds.

The plasticizing mono-ethylenically unsaturated esters are those esters containing only one ethylenic group and no other polymerizable reactive group. These monomers can be represented by the graphic formula:

In this formula R represents an alkyl group containing a total of from about 5 to about 20 carbon atoms, either linearly arranged or with pendant side chains, Y represents either a —COO— or a —OOC— linkage, Z represents a hydrogen atom or a methyl group, and X represents a hydrogen atom, a methyl group, or an alkyl ester radical such as

wherein R' represents an alkyl radical having up to about 8 carbon atoms, either linearly arranged or with pendant side chains.

Illustrative of the plasticizing mono-ethylenically unsaturated monomers which are useful in this invention are the mono- and poly-esters such as 2-ethylhexylacrylate, di-2-ethylhexyl maleate, vinyl 2-ethylhexanoate, dodecyl crotonate, vinyl stearate, vinyl laurate, myristyl methacrylate, tetradecyl acrylate, tetradecyl crotonate, dodecyl acrylate, vinyl caprate, vinyl caprylate, and other mono-ethylenically unsaturated mono- or poly-ester compounds.

The fusible and reactive internally-plasticized polymers can be produced by carrying out the polymerization at a temperature below about 80° C. Preferably the polymerization is carried out in the presence of a free-radical type catalyst in solution in an organic solvent, or in an aqueous emulsion, or in an aqueous suspension. In the emulsion or aqueous polymerizations, when the reaction is carried out at temperatures below about 50° C., it is desirable to employ an activator such as sodium bisulfite, sodium sulfite, sodium hyposulfite, sodium sulfate or sulphur dioxide to speed up the reaction. The reactive polymers produced are soluble in acetone, methyl ethyl ketone, ethylene glycol monobutyl ether or toluene. Small amounts of other polymerizable monomers, such as vinylidene chloride, do not affect the properties of the resin.

To this fusible and reactive internally-plasticized terpolymer a second catalyst or a further quantity of the original catalyst used in the polymerization reaction can be added. This added catalyst activates the internally-plasticized terpolymer composition. The activation is preferably carried out at a temperature above the temperature at which the initial polymerization was conducted. Upon curing the fusible composition at a temperature of about 100° C. to about 200° C. there is produced a flexible tough, infusible and insoluble terpolymer.

The fusible and reactive internally-plasticized polymers are produced by copolymerizing a mixture which contains from about 30 parts to about 95 parts by weight of vinyl chloride. Preferably an amount of vinyl chloride is employed which is from about 60 parts to about 80 parts by weight. This is copolymerized with from about 0.1 part to about 40 parts by weight of a multi-ethylenically unsaturated oxygen containing monomer and from about 5 parts to about 70 parts by weight of a plasticizing monoethylenically unsaturated ester, per 100 parts of the total reactive monomers. At vinyl chloride concentrations above about 60 parts by weight the polymers are superior in strength and toughness to those having a lower vinyl chloride content.

The polymerization reaction can also be controlled to insure the formation of fusible and soluble polymers by the addition of a chain-transfer agent or degrader to the monomers mixture. Suitable chain-transfer agents are isobutylene, dipentene, ethylene oxide, acetaldehyde and trichloroethylene.

In one embodiment of this invention the reactive polymers can be produced by reacting the monomers mixture in an inert organic solvent, that is one which will not interfere with or participate in the copolymerization reaction. The polymerization is carried out at autogenous pressure at a temperature of from about 0° C. to about 80° C. A temperature of from about 40° C. to about 60° C. is preferred. Suitable organic solvents are acetone, toluene, methyl ethyl ketone and methyl isobutyl ketone. The monomer mixture can contain from about 30 parts to about 95 parts by weight of vinyl chloride, from about 1 part to about 40 parts by weight of a multi-ethylenically unsaturated oxygen containing monomer and from about 5 parts to about 70 parts by weight of a plasticizing mono-ethylenically unsaturated ester, per 100 parts of monomers. The preferred ranges are from 60 parts to about 80 parts by weight of vinyl chloride, from about 5 parts to about 10 parts by weight of multi-ethylenically unsaturated oxygen containing monomer and from about 20 parts to about 40 parts by weight of plasticizing mono-ethylenically unsaturated ester. The weight ratio of solvent:total monomers can be varied from about 0.4 to about 1.5 parts of solvent per part of total monomers charged. The catalyst concentration can be varied from about 0.1 part to about 2 parts by weight per 100 parts of monomers charged. The catalysts are those which can be activated at temperatures of from about 0° C. to about 80° C., as for example, acetyl peroxide, benzoyl peroxide, dichloroacetyl peroxide, di-t-butyl peroxide or t-butyl perbenzoate. To produce the fusible and reactive internally-plasticized polymers the polymerization reaction is stopped when reaction in the inert organic solvent has proceeded to about a 25% conversion to polymer. To allow the reaction to proceed further tends to the formation of resin which is difficult to process and which is infusible and insoluble. The fusible and reactive internally-plasticized polymer is recovered by pouring the reaction mixture into isopropanol, or a similar precipitant, and filtering off the precipitated resin.

In other embodiments of this invention the fusible reactive polymers can be produced by carrying out the polymerization in an aqueous emulsion or in an aqueous suspension. In these embodiments the monomers mixture can be varied from about 30 parts to about 95 parts by weight of vinyl chloride per 100 parts of monomers charged. Preferably from about 60 parts to about 80 parts by weight of vinyl chloride is employed. This is copolymerized with from about 0.1 part to about 5 parts by weight of multi-ethylenically unsaturated oxygen containing monomer, preferably from about 0.1 part to about 2 parts by weight, and from about 5 parts to about 70 parts by weight of plasticizing mono-ethylenically unsaturated ester, preferably from about 10 parts to about 40 parts by weight, per 100 parts of monomers. The weight ratio of water:total monomers can be varied from about 1 to about 2.33 parts of water per part of total monomers charged. The monomers can be emulsified by adding from about 0.1 to about 2 parts by weight, preferably from about 0.1 part to about 0.5 part, of an emulsifying agent such as, for example, sodium 1-isobutyl-4-ethyl-octyl sulfate, sodium lauryl sulfate or sodium dioctyl sulfosuccinate to the water-monomers mixture. The polymerization is catalyzed by the addition of from about 0.2 part to about 3 parts by weight of a free-radical catalyst. The preferred catalyst concentration is from about 0.5 part to about 1.5 parts by weight per 100 parts of monomers. Among the catalysts suitable are potassium persulfate, alpha alpha'-azo-bis-isobutyronitrile and lauryl peroxide. In the aqueous emulsion and aqueous suspension processes the polymerization can be conducted at autogenous pressure at temperatures of from about 10° C. to about 80° C.. The preferred temperature range is from about 40° C. to about 60° C. The polymerization in the emulsion and suspension processes can be permitted to proceed to conversions up to about 90%. The terpolymer can then be precipitated out by addition of a calcium chloride solution, isopropanol, or similar precipitant to the polymer emulsion. The precipitated polymer can then be recovered by filtration or other suitable means. The concentration of multi-ethylenically unsaturated oxygen containing monomer should be kept below about 5 parts by weight in the emulsion and suspension processes to produce fusible and reactive terpolymers. Larger concentrations can be used but premature cross-linking can occur and infusible and insoluble terpolymers may be produced.

The fusible and reactive internally-plasticized terpolymers can vary in molecular weight. The molecular weight of these terpolymers is dependent on the reaction temperature, time and pressure, on the catalyst, on the concentrations of the monomers charged and of the catalyst and also on whether or not a degrader has been added. The curing of the fusible and reactive polymers to flexible infusible and insoluble resins apparently proceeds through a cross-linking reaction. Thus it is necessary that sufficient pendant reactive groups are present in the fusible and soluble terpolymer to yield a flexible infusible and insoluble finished product.

The lower molecular weight fusible and reactive internally-plasticized terpolymers require a higher multi-ethylenically unsaturated monomer content than do the higher molecular weight reactive internally-plasticized terpolymers. By low molecular weight terpolymers is meant those resins having a viscosity between about 0.01 to about 0.1; while those resins having a viscosity greater than about 0.1 are considered high molecular weight resins. The viscosity of the resins is determined at 20° C. using 0.2 g. of resin per 100 ml. of cyclohexanone. In some instances the presence of small amounts of insoluble resin makes it impossible to determine the viscosity. The higher molecular weight fusible and reactive terpolymers contain sufficient pendant reactive groups to cure to flexible infusible and insoluble resins when a multi-ethylenically unsaturated monomer content of from about 0.1 part to about 20 parts by weight per 100 parts of monomers charged is used in preparing the reactive terpolymers. The lower molecular weight fusible and reactive terpolymers, however, require a multi-ethylenically unsaturated monomer content of from about 10 parts to about 40 parts by weight per hundred parts of monomers charged in order to obtain a satisfactory cure. By using no more than about 40 parts by weight of multi-ethylenically unsaturated monomers, per 100 parts of monomers, flexible tough, infusible and insoluble cured products are obtained having high tensile strengths. Whereas, at higher multi-ethylenically unsaturated contents the cured products have low tensile strengths.

In the initial copolymerization reaction the plasticizing mono-ethylenically unsaturated ester becomes chemically bound to the terpolymer imparting plasticity thereto. Since it is chemically combined in the molecule it cannot migrate and therefore the resin produced is permanently plasticized. The concentration of plasticizing unsaturated ester can be varied from about 5 parts to about 70 parts by weight per 100 parts of total monomers charged. The preferred range is from about 10 parts to about 40 parts by weight.

The fusible and reactive internally-plasticized terpolymers are cured to flexible, tough, infusible and insoluble resins by curing at a temperature of above about 100° C.

in the presence of a catalyst. The curing catalyst can be added to the reactive terpolymer by any suitable manner, as for example, by milling it into the heat-softened terpolymer on a mill, or by adding it to an organic solvent solution of the terpolymer. The catalyst can be added at a temperature about 20° C. below the activation temperature of the catalyst in order to prevent precuring of the fusible and reactive polymer during the addition. Preferably the catalyst is added at a temperature below about 90° C. The concentration of the catalyst added can be varied from about 1 part to about 8 parts by weight per 100 parts of reactive polymer. Preferably a concentration of from about 2 parts to about 5 parts by weight is added.

Illustrative of the catalysts suitable for curing the fusible and reactive polymers are chlorobenzoyl peroxide, lauroyl peroxide, di-t-butyl peroxide, stearoyl peroxide, t-butyl hydroperoxide and t-butyl perbenzoate, or mixtures thereof. One can also use mixtures of the above peroxide compounds with cobalt octoate; or a mixture of a mineral spirits solution of a zirconium organo complex (technically known as Zirco Drier) with a mixture of rare earth metal naphthenates (mainly cerium and lanthanum).

The catalyst-containing reactive terpolymer compositions can be cured to flexible tough, infusible and insoluble resins by heating at from about 100° C. to about 200° C. for from about 3 to about 30 minutes at atmospheric or superatmospheric pressures. Preferably conditions of time, temperature, pressure and catalyst concentration are selected which will given sufficient cure in from about 10 to about 15 minutes at about 150° C. The catalyst-containing reactive terpolymers can be used in solution for coating wire or other flat or shaped articles, as well as in dip- and spray-coating techniques known to those experienced in the art. These terpolymer compositions can also be milled, molded, extruded or shaped by the usual techniques which are well known in the art.

The following examples further illustrate the nature of this invention. Ratios and percentages are by weight unless otherwise indicated.

*Example 1*

A 250 ml. citrate of magnesia pressure bottle was charged with 76 g. of vinyl chloride, 4 g. of diallyl pimelate, 20 g. of 2-ethylhexyl acrylate, 100 g. of substantially anhydrous acetone and 2 g. of a 25% by weight solution of acetyl peroxide in dimethyl phthalate. The catalyst concentration was 0.5%; the vinyl chloride:diallyl pimelate:2-ethylhexyl acrylate ratio was 76:4:20; and the solvent:monomers ratio was 1:1. The reaction bottle was sealed, placed in a constant temperature water bath maintained at 50° C. and mechanically agitated in this bath for 3½ hours. It was then removed, cooled to room temperature and vented to remove unreacted vinyl chloride. The terpolymer, which had a sticky consistency, was precipitated by slowly pouring the acetone solution into 300 ml. of isopropanol while stirring continuously. The terpolymer was filtered off, redissolved in acetone and reprecipitated as above in order to remove any residual unreacted monomer. The filtered terpolymer was dried at room temperature, yield was 22.5 g. The terpolymer was a white resin soluble in acetate, methyl isobutyl ketone and cyclohexanone; having a 40.9% vinyl chloride content and a viscosity of 0.171.

*Example 2*

Using the same procedure as described in Example 1 a terpolymer was produced from a mixture consisting of 60 g. vinyl chloride, 12 g. diallyl pimelate, 8 g. 2-ethylhexyl acrylate, 120 g. of acetone and 2 g. of a 25% solution of acetyl peroxide in dimethyl phthalate. The polymerization was carried out for 5 hours. The catalyst concentration was 0.5%; the vinyl chloride:diallyl pimelate:2-ethylhexyl acrylate ratio was 75:15:10; and the solvent:monomers ratio was 1.73:1. Yield of terpolymer was 25 g. The resin was white, soluble in acetone, methyl isobutyl ketone and cyclohexanone; and had a 55.8% vinyl chloride content.

*Example 3*

Using the same procedure as described in Example 1 a terpolymer was produced from a mixture consisting of 72 g. of vinyl chloride, 4 g. of diallyl succinate, 4 g. of di-2-ethylhexyl-maleate, 120 g. of acetone and 2 g. of a 25% solution of acetyl peroxide in dimethyl phthalate. The polymerization was carried out for 3 hours. The catalyst concentration was 0.5%; the vinyl chloride:diallyl succinate:di-2-ethylhexyl-maleate ratio was 90:5:5, and the solvent:monomers ratio was 1.5:1. Yield of terpolymer was 33 g. The resin was white, soluble in acetone and cyclohexanone; and had an 87.8% vinyl chloride content, and a specific viscosity of 0.119.

*Example 4*

Using the same procedure as described in Example 1 a terpolymer was produced from a mixture consisting of 72 g. of vinyl chloride, 4 g. of diallyl succinate, 4 g. of vinyl-2-ethyl hexanoate, 120 g. of acetone and 2 g. of a 25% solution of acetyl peroxide in dimethyl phthalate. The polymerization was carried out for 3 hours. The catalysts concentration was 0.5%; the vinyl chloride:diallyl succinate:vinyl-2-ethyl hexanoate ratio was 90:5:5, and the solvent:monomers ratio was 1.5:1. Yield of terpolymer was 39 g. The resin was white, soluble in acetone and cyclohexanone; and had a 90.6% vinyl chloride content, and a specific viscosity of 0.139.

*Example 5*

An aqueous emulsion was prepared in a 250 ml. citrate of magnesia pressure bottle, consisting of 36 g. of vinyl chloride, 23.4 g. of di-2-ethylhexyl-maleate, 0.6 g. of diallyl succinate, 133 g. of deionized water, 7 g. of ethylene glycol, 1.2 g. of sodium dioctyl sulfosuccinate and 0.3 g. of potassium persulfate. The reaction bottle was sealed, placed in a constant temperature water bath maintained at 40° C. and mechanically agitated in this bath for 21 hours. The catalyst concentration was 0.5%; the vinyl chloride:di-2-ethylhexyl-maleate:diallyl succinate ratio was 60:39:1, and the solvent:monomers ratio was 2.33:1. The reaction bottle was removed, cooled to room temperature and vented to remove unreacted vinyl chloride. The terpolymer emulsion was poured into twice its volume of distilled water and the emulsion was then broken at 50° C. by the addition of 5 ml. of a 10% calcium chloride solution. The precipitated terpolymer was filtered off and then washed in water and finally in isopropanol. The resin was dried at room termperature in a forced air oven, yield was 22 g. The resin was white, partially soluble in acetone and cyclohexanone and had a 50.6% vinyl chloride content.

*Example 6*

Using the same procedure as described in Example 5 a terpolymer was produced using a mixture consisting of 54.78 g. of vinyl chloride, 4.8 g. of dodecyl acrylate, 0.42 g. of diallyl succinate, 133 g. of deionized water, 7 g. of ethylene glycol, 1.2 g. of sodium dioctyl sulfosuccinate and 0.3 g. of potassium persulfate. The polymerization was carried out for 5½ hours. The catalyst concentration was 0.5%; the vinyl chloride:dodecyl acrylate:diallyl succinate ratio was 91.3:8:0.7, and the solvent:monomers ratio was 2.33:1. Yield of terpolymer was 12 g. The resin was white, and was insoluble in cyclohexanone; it had a 61% vinyl chloride content.

*Example 7*

Using the same procedure as described in Example 5 a terpolymer was produced using a mixture consisting of 7.5 lb. of vinyl chloride, 4.2 lb. of 2-ethylhexyl acrylate, 0.08 lb. of diallyl succinate, 28 lb. of deionized water, 12 lb. of ethylene glycol, 0.6 lb. of sodium dioctyl sulfosuccinate and 0.06 lb. of potassium persulfate. After 13 hours added another 0.08 lb. of diallyl succinate; reacted for another 2½ hours and then added another 0.08 lb. of diallyl succinate. The total polymerization time was 22 hours. The catalyst concentration was 0.5%; the vinyl chloride:2-ethylhexyl acrylate:diallyl succinate ratio was 63:35:2, and the solvent:monomers ratio was 2.33:1. Yield of terpolymer was 8.5 lb. The resin was white, and had a 57.9% vinyl chloride content.

*Example 8*

Using the same procedure and polymerization time as described in Example 6 a terpolymer was produced using a mixture consisting of 34.2 g. of vinyl chloride, 23.4 g. of vinyl caprate, 2.4 g. of vinyl crotonate, 13.3 g. of deionized water, 7 g. of ethylene glycol, 1.2 g. of sodium dioctyl sulfosuccinate and 0.3 g. of potassium persulfate. The catalyst concentration was 0.5%; the vinyl chloride:vinyl caprate:vinyl crotonate ratio was 57:39:4 and the solvent:monomers ratio was 2.33:1. Yield of terpolymer was 25 g. The resin was white and had a 67.8% vinyl chloride content.

*Example 9*

An aqueous suspension was prepared in a 250 ml. citrate of magnesia pressure bottle, consisting of 36 g. of vinyl chloride, 22.8 g. of 2-ethylhexyl acrylate, 1.2 g. of diallyl succinate, 140 g. of deionized water, 2.6 g. of a water soluble low viscosity hydroxyethylated cellulose and 0.3 g. of alpha, alpha' azobis-isobutyronitrile. The reaction bottle was sealed, placed in a constant temperature water bath maintained at 40° C. and mechanically agitated in this bath for 1¾ hours. The catalyst concentration was 0.5%; the vinyl chloride:2-ethylhexyl acrylate:diallyl succinate ratio was 60:38:2, and the solvent:monomers ratio was 1:1. The reaction bottle was removed, cooled to room temperature and vented to remove unreacted vinyl chloride. The terpolymer was precipitated by pouring the suspension into twice its volume of isopropanol while stirring the mixture. The precipitated resin was filtered off, washed with isopropanol and dried at room temperature in a forced air oven. Yield of terpolymer was 8 g. The resin was white and had an 18.9% vinyl chloride content.

*Example 10*

Using the same procedure as described in Example 9 a terpolymer was produced from a mixture consisting of 64 g. of vinyl chloride, 14.4 g. of 2-ethylhexyl acrylate, 1.6 g. of diallyl succinate, 140 g. of deionized water, 2.6 g. of a water soluble low viscosity hydroxyethylated cellulose and 0.2 g. of alpha, alpha' azobis-isobutyronitrile. The catalysts concentration was 0.25%; the vinyl chloride:2-ethylhexyl acrylate:diallyl succinate ratio was 80:18:2, and the solvent:monomers ratio was 1.5:1. The polymerization was carried out for 10 hours. Yield of terpolymer was 22.7 g. The resin was white and had a 50.2% vinyl chloride content.

*Example 11*

Using the same procedure as described in Example 9 a terpolymer was produced using a mixture consisting of 60 g. of vinyl chloride, 18.4 g. of 2-ethylhexyl acrylate, 1.6 g. of diallyl succinate, 120 g. of deionized water, 0.3 g. of a back hydrolized polyvinyl acetate as suspension agent and 0.2 g. of lauroyl peroxide. The catalyst concentration was 0.25%; the vinyl chloride:2-ethylhexylacrylate:diallyl succinate ratio was 75:23:2 and the solvent:monomers ratio was 1.5:1. The polymerization was carried out for 29 hours. Yield of terpolymer was 59 g. The resin was white and had a 69.4% vinyl chloride content.

*Example 12*

Thirty grams of the dried resin obtained in Example 5 was fluxed on a two-roll mill at 40° C. for about 10 minutes. During this period 0.15 g. of dibutyl tin maleate, 0.6 g. of t-butyl perbenzoate and 1.5 g. of a 6% by weight solution of cobalt octoate in mineral spirits were added. The milled blend was molded in a press mold for 5 minutes to produce a 5 inch circular disc ⅛ inch thick at 130° C. at sufficient pressure to give good flow in the mold. The molded material showed the following properties:

| | |
|---|---|
| Tensile, p.s.i. | 1950 |
| Elongation, percent | 160 |
| Load at 100% elongation, p.s.i. | 1750 |
| Stiffness modulus, p.s.i. (ASTM D747–48T) | 8940 |
| $T_F$, ° C. (ASTM D1043–51) | 6.5 |
| $T_4$, ° C. | 27 |
| Brittle temperature, ° C. | −2 |
| Shore hardness, Durometer A | 84 |

*Example 13*

Fifty grams of the dried resin obtained in Example 7 was milled on a two-rolled mill at about 25° C. for about 10 minutes. During this period 0.5 g. of dibutyl tin maleate, 1 g. of t-butyl perbenzoate, 1 g. of a mixture of rare earth metallic naphthenates and 1.6 g. of a 6% solution of a zirconium organo complex in mineral spirits (Zirco Drier) were added. The milled blend was molded to a 5 inch circular disc ⅛ inch thick in a press mold for 10 minutes at 150° C. at sufficient pressure to give good flow in the mold. The molded material showed the following properties:

| | |
|---|---|
| Tensile, p.s.i. | 1275 |
| Elongation, percent | 125 |
| Load at 100% elongation, p.s.i. | 1000 |
| Stiffness modulus, p.s.i. (ASTM D747–48T) | 637 |
| $T_F$, ° C. (ASTM D1043–51) | −23 |
| $T_4$, ° C. | −5 |
| Brittle temperature, ° C. | −26 |
| Shore hardness, Durometer A | 63 |

Tensile, elongation and load were obtained using a Scott L–6 tensile tester operating at a constant rate of elongation of 4 feet per minute.

What is claimed is:

An infusible and insoluble resin produced by curing at from about 100° C. to about 200° C. in the presence of a cure catalyst comprising from about 0.15 part of dibutyl tin maleate, 0.6 part of t-butyl perbenzoate, and 1.5 part of a 6 percent by weight solution of cobalt octoate in mineral spirits, the soluble and reactive internally plasticized resin produced from the conjoint aqueous emulsion polymerizaiton at a temperature of from about 0° C. to about 80° C. and in contact with a catalytic amount of potassium persulfate of a mixture of from about 30 parts to about 95 parts by weight of vinyl chloride, from about 0.1 part to about 40 parts by weight of diallyl succinate, and from about 5 parts to about 70 parts by weight of di-2-ethylhexyl maleate per hundred parts by weight of the mixture.

References Cited in the file of this patent

UNITED STATES PATENTS

| | | |
|---|---|---|
| 2,273,891 | Pollack et al. | Feb. 24, 1942 |
| 2,605,254 | Wolf | July 29, 1952 |
| 2,608,549 | Wolf | Aug. 26, 1952 |
| 2,628,210 | Etchason et al. | Feb. 10, 1953 |
| 2,754,280 | Brown et al. | July 10, 1956 |
| 2,845,404 | Garner et al. | July 29, 1958 |